Figure 6:
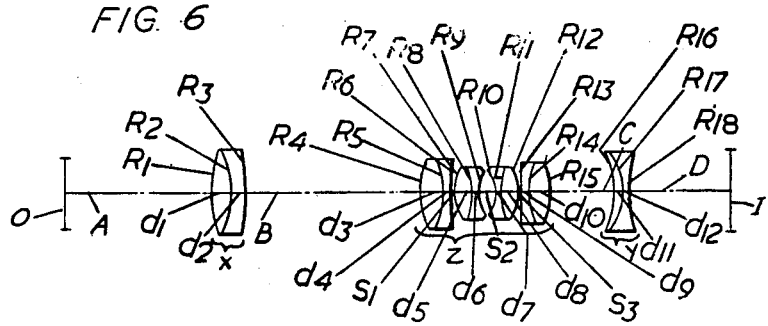

April 29, 1958     G. H. COOK     2,832,262
ANAMORPHOTIC OPTICAL SYSTEMS
Filed Aug. 23, 1954     4 Sheets-Sheet 1
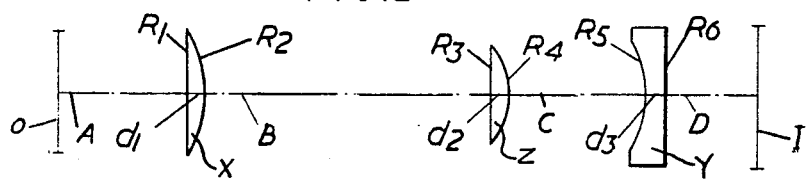
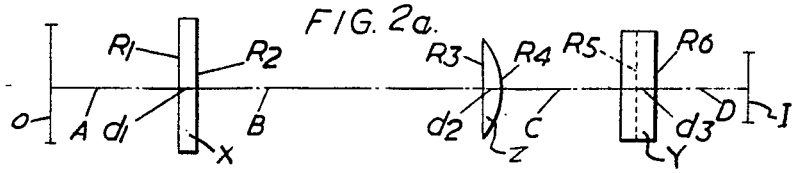
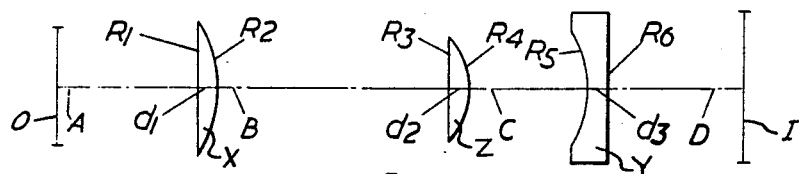
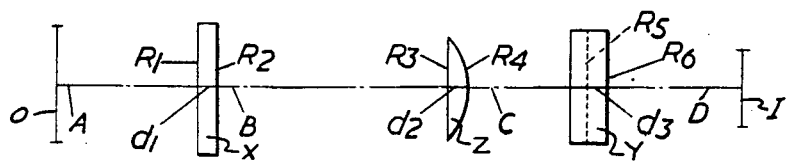
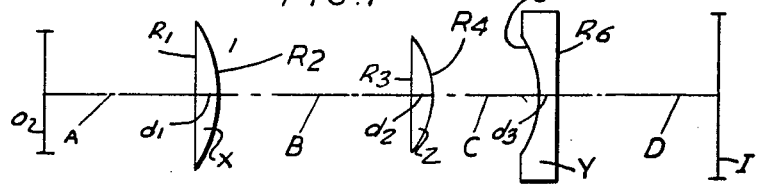
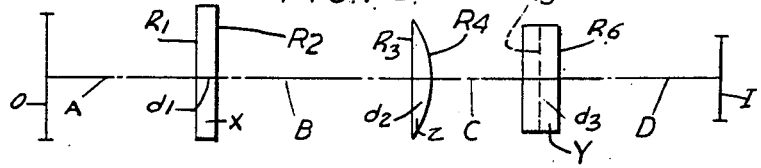
Inventor
GORDON H. COOK
By Holcombe, Wetherill & Brisebois
Attorneys April 29, 1958  G. H. COOK  2,832,262
ANAMORPHOTIC OPTICAL SYSTEMS
Filed Aug. 23, 1954  4 Sheets-Sheet 2
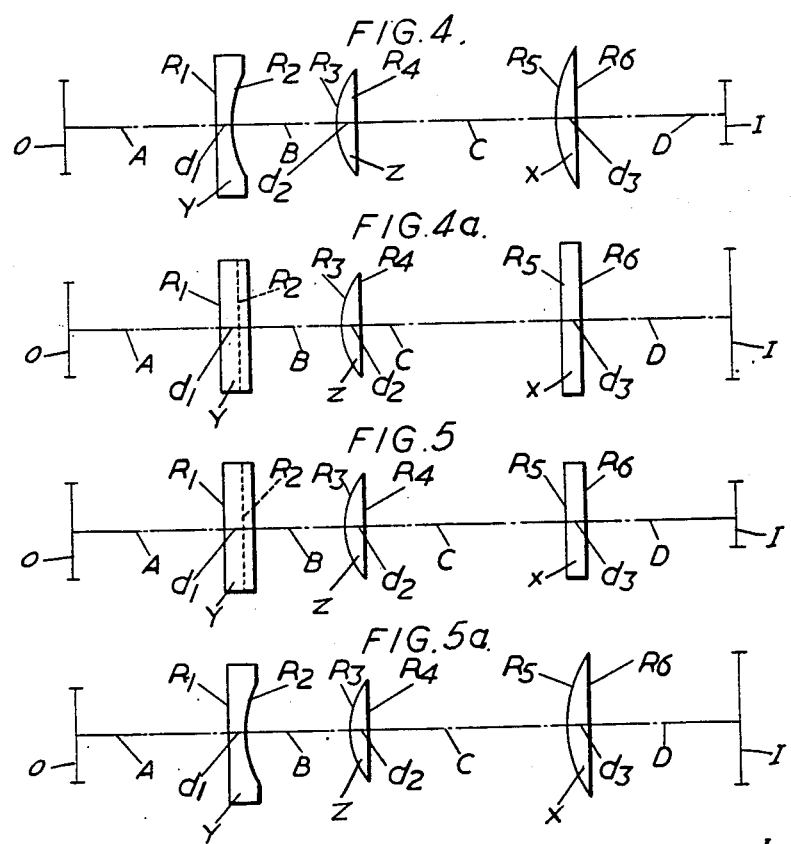
Inventor
GORDON H. COOK Inventor
GORDON H. COOK April 29, 1958  G. H. COOK  2,832,262
ANAMORPHOTIC OPTICAL SYSTEMS
Filed Aug. 23, 1954  4 Sheets-Sheet 4

Inventor
Gordon Henry Cook
By
His Attorneys.

# United States Patent Office 2,832,262
Patented Apr. 29, 1958

2,832,262
ANAMORPHOTIC OPTICAL SYSTEMS

Gordon Henry Cook, Leicester, England, assignor to Taylor, Taylor & Hobson Limited, Leicester, England, a British company Application August 23, 1954, Serial No. 451,568

9 Claims. (Cl. 88—57)

This invention relates to an anamorphotic optical system, more especially intended for effecting lateral compression or expansion of an image. A system of cylindrical or prismatic components has been used in conjunction with a photographic objective for enabling an unusually wide panoramic view to be photographed on to a film picture frame of normal size, and a similar system has been used in conjunction with a projection objective whereby the same film with the laterally compressed image is projected on to a wide screen, the lateral expansion afforded by the anamorphotic system bringing the screen image back again to the aspect ratio of the original wide panoramic view. In such instance, the two conjugates, respectively on the object and image sides, are widely different, thus providing considerable magnification in projection and reduction in photographing. With such arrangements, minor modifications in component separation are necessary to accommodate small changes in the long conjugate distance to maintain simultaneous focus in the two meridians of the object and image planes, but since such modifications introduce aberration and change the compression ratio, they are necessarily very limited in extent.

In some instances, however, it is desired to use anamorphotic components in conjunction with a copying objective operating at or near unity magnification, or some other objective with relatively small magnification, and it is not practicable to meet such requirements by altering the dimensions of the above-mentioned systems. It has been proposed, in such case, to employ an anamorphotic system comprising two convergent cylindrical components with their generators at right angles to one another, the two components being so disposed that the object and image planes of one of them in its plane of operation are coincident with those of the other in its plane of operation, their magnifications however being different, so that the effective magnifications of the complete system in the two operative planes are different from one another. This arrangement however requires complex cylindrical components in order to achieve the desired high standard of definition at useful apertures and is therefore difficult to design and expensive to manufacture.

The present invention has for its object to provide an improved anamorphotic system, suitable for such purposes, which will give a high standard of performance at wide apertures whilst using simple cylindrical components.

The anamorphotic system according to this invention gives different magnifications in two mutually perpendicular planes of operation for the same conjugate planes, and comprises two cylindrical members having their generators parallel to one another, one of such members being convergent and the other divergent, and a convergent spherical member interposed between the two cylindrical members.

The arithmetic mean between the positive values of the equivalent focal lengths of the two cylindrical members preferably bears a ratio to the equivalent focal length of the spherical member lying between 0.4 and 1.2 times the ratio of the greater of the two magnifications to the difference between such magnifications.

Each cylindrical member preferably includes at least one convergent element and at least one divergent element, the convergent cylindrical member including at least one dispersive internal contact, whilst the divergent cylindrical member includes at least one collective internal contact. Conveniently, the convergent cylindrical member has both its outer surfaces convex, and the divergent cylindrical member has both its outer surfaces concave.

It should be made clear that the term "internal contact" as herein used is intended to include not only a cemented internal contact, but also what is commonly termed a "broken contact," wherein the two engaging surfaces have slightly different radii of curvature. In the case of a "broken contact," the power of the contact is the harmonic mean between the powers of the two engaging surfaces.

The invention may be carried into practice in various ways, but some convenient alternative arrangements of anamorphotic optical system according thereto are illustrated in the accompanying drawings, in which—

Figures 1 and 1a respectively show diagrammatic views in the two operative planes at right angles to one another of one arrangement, the figures being based on approximate "thick lens" calculations, from which fully corrected data can be developed.

Figure 6A:
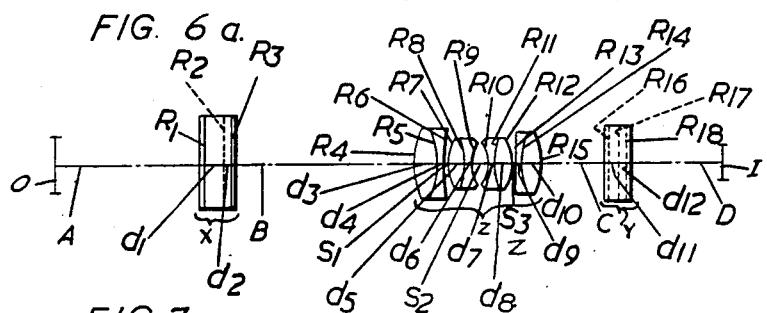

Figures 2 and 2a, and Figures 3 and 3a, respectively show two variants of the arrangement of Figures 1 and 1a;

Figures 4 and 4a, and Figures 5 and 5a, respectively show two inversions of the arrangement of Figures 1 and 1a;

Figures 6 and 6a show a fully corrected arrangement; and

Figures 7 and 7a, and Figures 8 and 8a, respectively show two further fully corrected arrangements.

In each figure, the front conjugate plane is indicated at O and the rear conjugate plane at I, the convergent and divergent cylindrical members are respectively marked X and Y, and the spherical member is marked Z.

Two sets of approximate calculations, respectively of the "thin lens" type and of the "thick lens" type, are given in the tables below for each of the first five of the eight arrangements illustrated.

In these tables, the first column gives the reference letter representing a dimension (such as an axial distance or a radius or a focal length), and the second and third columns give the values of such dimension in terms of an arbitrary unit, respectively in the two operative planes. Usually plane I will be the horizontal plane and plane II the vertical plane, but this is not essentially so in all cases. The letter A repersents the axial distance from the front conjugate plane O to the front surface of the front cylindrical member X, the letter B represents the axial distance between the rear surface of the front cylindrical member X and the front surface of the spherical member Z, the letter C represents the axial distance between the rear surface of the spherical member Z and the front surface of the rear cylindrical member Y, and the letter D represents the axial distance from the rear surface of the rear cylindrical member Y to the rear conjugate plane.

The "thin lens" tables give the equivalent focal lengths $f_1$, $f_2$ and $f_3$ respectively for the front cylindrical member, the spherical member and the rear cylindrical member (the positive sign indicating convergence and the negative sign divergence), and the overall magnifications.

The "thick lens" tables do not give the equivalent focal lengths or magnifications, since these are in each case the same as those in the corresponding "thin lens" tables, but give instead the radii of curvature $R_1$, $R_2$ ... of the front and rear surfaces of the various members in the two planes of operation (the positive sign indicating that the surface is convex to the front and the negative sign that it is concave thereto), and the axial thicknesses $d_1$, $d_2$, $d_3$ of the members. These tables also give the mean refractive index $n_d$ for the $d$-line of the spectrum and the Abbé V number, for each of the materials used.

*Example I (thin lens) (Figures 1 and 1a)*

| | Plane I (Figure 1) | Plane II (Figure 1a) |
|---|---|---|
| A= | 4.21 | 4.21 |
| $f_1$= | +6.37 | ∞ |
| B= | 5.41 | 5.41 |
| $f_2$= | +4.0 | +4.0 |
| C= | 2.61 | 2.61 |
| $f_3$= | −6.37 | ∞ |
| D= | 4.24 | 4.24 |
| Magnification | 1.424 | .712 |

*Example I (thick lens)*

| | Plane I | Plane II | $n_d$ | V |
|---|---|---|---|---|
| A= | 3.880 | 3.880 | | |
| $R_1$= | ∞ | ∞ | | |
| $d_1$= | 0.5 | 0.5 | 1.519 | 60.4 |
| $R_2$= | −3.306 | ∞ | | |
| B= | 5.083 | 5.083 | | |
| $R_3$= | ∞ | ∞ | | |
| $d_2$= | 0.5 | 0.5 | 1.519 | 60.4 |
| $R_4$= | −2.0755 | −2.0755 | | |
| C= | 2.614 | 2.614 | | |
| $R_5$= | −3.306 | ∞ | | |
| $d_3$= | 0.5 | 0.5 | 1.519 | 60.4 |
| $R_6$= | ∞ | ∞ | | |
| D= | 3.907 | 3.907 | | |

*Example II (thin lens) (Figures 2 and 2a)*

| | Plane I (Figure 2) | Plane II (Figure 2a) |
|---|---|---|
| A= | 3.53 | 3.53 |
| $f_1$= | +6.37 | ∞ |
| B= | 7.33 | 7.33 |
| $f_2$= | +4.0 | +4.0 |
| C= | 3.43 | 3.43 |
| $f_3$= | −6.37 | ∞ |
| D= | 2.90 | 2.90 |
| Magnification | 1.167 | .584 |

*Example II (thick lens)*

| | Plane I | Plane II | $n_d$ | V |
|---|---|---|---|---|
| A= | 3.198 | 3.198 | | |
| $R_1$= | ∞ | ∞ | | |
| $d_1$= | 0.5 | 0.5 | 1.519 | 60.4 |
| $R_2$= | −3.306 | ∞ | | |
| B= | 6.997 | 6.997 | | |
| $R_3$= | ∞ | ∞ | | |
| $d_2$= | 0.5 | 0.5 | 1.519 | 60.4 |
| $R_4$= | −2.0755 | −2.0755 | | |
| C= | 3.431 | 3.431 | | |
| $R_5$= | −3.306 | ∞ | | |
| $d_3$= | 0.5 | 0.5 | 1.519 | 60.4 |
| $R_6$= | ∞ | ∞ | | |
| D= | 2.573 | 2.573 | | |

*Example III (thin lens) (Figures 3 and 3a)*

| | Plane I (Figure 3) | Plane II (Figure 3a) |
|---|---|---|
| A= | 3.83 | 3.83 |
| $f_1$= | +6.37 | ∞ |
| B= | 6.32 | 6.32 |
| $f_2$= | +4.0 | +4.0 |
| C= | 3.06 | 3.06 |
| $f_3$= | −6.37 | ∞ |
| D= | 3.54 | 3.54 |
| Magnification | 1.30 | .65 |

*Example III (thick lens)*

| | Plane I | Plane II | $n_d$ | V |
|---|---|---|---|---|
| A= | 3.506 | 3.506 | | |
| $R_1$= | ∞ | ∞ | | |
| $d_1$= | 0.5 | 0.5 | 1.519 | 60.4 |
| $R_2$= | −3.306 | ∞ | | |
| B= | 5.990 | 5.990 | | |
| $R_3$= | ∞ | ∞ | | |
| $d_2$= | 0.5 | 0.5 | 1.519 | 60.4 |
| $R_4$= | −2.0755 | −2.0755 | | |
| C= | 3.065 | 3.065 | | |
| $R_5$= | −3.306 | ∞ | | |
| $d_3$= | 0.5 | 0.5 | 1.519 | 60.4 |
| $R_6$= | ∞ | ∞ | | |
| D= | 3.207 | 3.207 | | |

Examples II and III (respectively shown in Figures 2 and 2a and in Figures 3 and 3a) employ the same members as Example I (shown in Figures 1 and 1a), but their relative positions are different. These three examples can therefore be regarded as together constituting a variable magnification anamorphotic system, suitable mechanism being provided for effecting appropriately inter-related movements of the members and of the conjugate planes to vary the magnification. Further examples can readily be worked out using other relative positions of the members and conjugate planes to give other magnifications. The compression ratio is 2 and remains unaltered when the relative positions are changed. The expression $(f_1+f_3)/2f_2$ amounts to 1.5925 (regarding only the positive or numerical values of these focal lengths) and is therefore .79625 times the ratio of the greater magnification to the difference between the two magnifications, such ratio remaining unaltered at 2 when the relative positions of the members are varied. The axial magnification of the convergent cylindrical member, that is the front cylindrical member, is 2.950 in Example I, 2.224 in Example II and 2.508 in Example III. The axial magnification of the divergent cylindrical member is 1.665 in Example I, 1.455 in Example II and 1.555 in Example III.

It will be noticed that, in each example, the conjugate planes occupy the same positions in both operative planes. The minor difference between the values of A, B, C and D in the thin lens calculations and in the thick lens calculations, in each example, of course arise from the necessity to accommodate thicknesses in the latter calculations. Aberration corrections will likewise involve further minor modifications, and in particular, although in the thick lens calculations each member is shown as consisting of a simple element, the correction of aberrations will usually necessitate the use of more than one element in each member. For example, each cylindrical member may be in the form of a doublet, whilst the spherical member will usually be of more complex structure.

One important use for the anamorphotic system according to the invention is to constitute an anamorphotic copying objective system for producing an undistorted positive image from a distorted negative obtained by means of a photographic objective provided with an anamorphotic attachment giving a desired compression ratio. Examples I, II and III (the compression ratio being determined by that used in the photographing, assumed to be 2), may be used in this connection for cinematograph film printing on to conventional film stock, the scale of the positive image determining how much of the negative is reproduced in the printing and therefore also the aspect ratio of the final picture projected on to the cinematograph screen, such final projection of course not requiring an anamorphotic system.

Another use for the anamorphotic system according to the invention is in connection with a modified wide screen cinematographic system which has been proposed, wherein an anamorphosis is avoided altogether at the camera stage by the use of wider negative films and wider angle camera objectives, but is introduced in printing on to conventional positive film stock in readiness for projection by means of a projection objective fitted with an anamorphotic attachment. This proposal has the advantage that the anamorphosis can be introduced more conveniently and with a higher level of definition. The anamorphotic system according to the present invention is very suitable for such anamorphosis at the printing stage, the system being used in the opposite sense to that above described, that is to say either back to front or with the system rotated through a right angle about the optical axis. Either of these inversions will give the smaller magnification in plane I of the examples and the larger magnification in plane II.

Thus, for instance, Examples IV and V (shown respectively in Figures 4 and 4a, and Figures 5 and 5a) are derived from Example I respectively by turning it back to front and by both turning it back to front and rotating it through a right angle about the optical axis.

*Example IV (thin lens) (Figures 4 and 4a)*

|  | Plane I (Figure 4) | Plane II (Figure 4a) |
|---|---|---|
| $A=$ | 4.24 | 4.24 |
| $f_1=$ | −6.37 | ∞ |
| $B=$ | 2.61 | 2.61 |
| $f_2=$ | +4.0 | +4.0 |
| $C=$ | 5.41 | 5.41 |
| $f_3=$ | +6.37 | ∞ |
| $D=$ | 4.21 | 4.21 |
| Magnification | .702 | 1.404 |

*Example IV (thick lens)*

|  | Plane I | Plane II | $n_d$ | V |
|---|---|---|---|---|
| $A=$ | 3.907 | 3.907 | | |
| $R_1=$ | ∞ | ∞ | | |
| $d_1=$ | 0.5 | 0.5 | 1.519 | 60.4 |
| $R_2=$ | +3.306 | ∞ | | |
| $B=$ | 2.614 | 2.614 | | |
| $R_3=$ | +2.0755 | +2.0755 | | |
| $d_2=$ | 0.5 | 0.5 | 1.519 | 60.4 |
| $R_4=$ | ∞ | ∞ | | |
| $C=$ | 5.083 | 5.083 | | |
| $R_5=$ | +3.306 | ∞ | | |
| $d_3=$ | 0.5 | 0.5 | 1.519 | 60.4 |
| $R_6=$ | ∞ | ∞ | | |
| $D=$ | 3.880 | 3.880 | | |

*Example V (thin lens) (Figures 5 and 5a)*

|  | Plane I (Figure 5) | Plane II (Figure 5a) |
|---|---|---|
| $A=$ | 4.24 | 4.24 |
| $f_1=$ | ∞ | −6.37 |
| $B=$ | 2.61 | 2.61 |
| $f_2=$ | +4.0 | +4.0 |
| $C=$ | 5.41 | 5.41 |
| $f_3=$ | ∞ | +6.37 |
| $D=$ | 4.21 | 4.21 |
| Magnification | 1.404 | .702 |

*Example V (thick lens)*

|  | Plane I | Plane II | $n_d$ | V |
|---|---|---|---|---|
| $A=$ | 3.907 | 3.907 | | |
| $R_1=$ | ∞ | ∞ | | |
| $d_1=$ | 0.5 | 0.5 | 1.519 | 60.4 |
| $R_2=$ | ∞ | +3.306 | | |
| $B=$ | 2.614 | 2.614 | | |
| $R_3=$ | +2.0755 | +2.0755 | | |
| $d_2=$ | 0.5 | 0.5 | 1.519 | 60.4 |
| $R_4=$ | ∞ | ∞ | | |
| $C=$ | 5.080 | 5.080 | | |
| $R_5=$ | ∞ | +3.306 | | |
| $d_3=$ | 0.5 | 0.5 | 1.519 | 60.4 |
| $R_6=$ | ∞ | ∞ | | |
| $D=$ | 3.880 | 3.880 | | |

The foregoing arrangements have all been described with reference to approximate calculations of the "thin" lens and "thick" lens types, but they can of course be appropriately modified to give full corrections for the various aberrations, involving the use of compound components for the cylindrical members and a group of components for the spherical member. Three such fully corrected examples, namely Examples VI, VII, VIII, are illustrated respectively in Figures 6 and 6a, in Figures 7 and 7a and in Figures 8 and 8a.

Examples VI and VII are each suitable for use as an anamorphotic copying objective for producing an undistorted positive image from a distorted negative area having dimensions, say, 0.937 inch horizontally by 0.735 inch vertically, with the picture detail compressed horizontally by the factor 2. With the cylindrical axes vertical, in Example VI, the full dimensions of the resultant positive image would be 1.091 inches horizontally by 0.429 inch vertically, but, since with standard positive film only 0.858 inch is available horizontally corresponding to a 2:1 aspect ratio with the 0.429 inch vertical dimension, part of the picture is masked out. By moving the objective laterally (without disturbing the direction of its optical axis or its focussing position) it would be possible to select the best portion of the complete picture for reproduction.

Example VII may be regarded as derived from Example VI by turning it from end to end and also rotating it through a right angle, but with some minor dimensional changes. These minor changes are needed because Example VII, like Example VI, is intended for use for producing an undistorted image from a distorted object. If Example VII, having its divergent cylindrical lens in front, had been required for producing a distorted image from an undistorted object, the minor dimensional changes would not have been needed. The necessary aberration corrections are slightly different in the two cases, depending on whether the divergent cylindrical lens is at the distorted end or at the undistorted end.

Example VIII is a further modification of Example VI designed for a compression ratio of 1.5. This modification, like Example VI, has its convergent cylindrical lens in front, but has been calculated, by way of variant, to be suitable for producing a distorted image from an undistorted object.

*Example VI (Figures 6 and 6a)*

|  | Plane I (Figure 6) | Plane II (Figure 6a) | $n_d$ | V |
|---|---|---|---|---|
| $A=$ | 3.776 | 3.776 | | |
| $R_1=$ | +4.4467 | ∞ | | |
| $d_1=$ | 0.501 | 0.501 | 1.54769 | 45.6 |
| $R_2=$ | −2.0237 | ∞ | | |
| $d_2=$ | 0.228 | 0.228 | 1.70035 | 30.3 |
| $R_3=$ | −7.6067 | ∞ | | |
| $B=$ | 4.648 | 4.648 | | |
| $R_4=$ | +2.5442 | +2.5442 | | |
| $d_3=$ | 0.569 | 0.569 | 1.69100 | 54.8 |
| $R_5=$ | −1.7742 | −1.7742 | | |
| $d_4=$ | 0.182 | 0.182 | 1.61200 | 44.9 |
| $R_6=$ | +16.7221 | +16.7221 | | |
| $S_1=$ | 0.009 | 0.009 | | |
| $R_7=$ | +1.2784 | +1.2784 | | |
| $d_5=$ | 0.455 | 0.455 | 1.57220 | 57.7 |
| $R_8=$ | −3.6067 | −3.6067 | | |
| $d_6=$ | 0.137 | 0.137 | 1.61590 | 44.5 |
| $R_9=$ | +0.8429 | +0.8429 | | |
| $S_2=$ | 0.455 | 0.455 | | |
| $R_{10}=$ | −0.8871 | −0.8871 | | |
| $d_7=$ | 0.137 | 0.137 | 1.61590 | 44.5 |
| $R_{11}=$ | +4.3804 | +4.3804 | | |
| $d_8=$ | 0.455 | 0.455 | 1.57220 | 57.7 |
| $R_{12}=$ | −1.2802 | −1.2802 | | |
| $S_3=$ | 0.043 | 0.043 | | |
| $R_{13}=$ | −16.2258 | −16.2258 | | |
| $d_9=$ | 0.182 | 0.182 | 1.61200 | 44.9 |
| $R_{14}=$ | +1.6193 | +1.6193 | | |
| $d_{10}=$ | 0.569 | 0.569 | 1.69100 | 54.8 |
| $R_{15}=$ | −2.5650 | −2.5650 | | |
| $C=$ | 1.700 | 1.700 | | |
| $R_{16}=$ | −4.1690 | ∞ | | |
| $d_{11}=$ | 0.228 | 0.228 | 1.70035 | 30.3 |
| $R_{17}=$ | −1.8973 | ∞ | | |
| $d_{12}=$ | 0.228 | 0.228 | 1.55154 | 63.5 |
| $R_{18}=$ | +5.0516 | ∞ | | |
| $D=$ | 2.498 | 2.498 | | |

Figure 7:
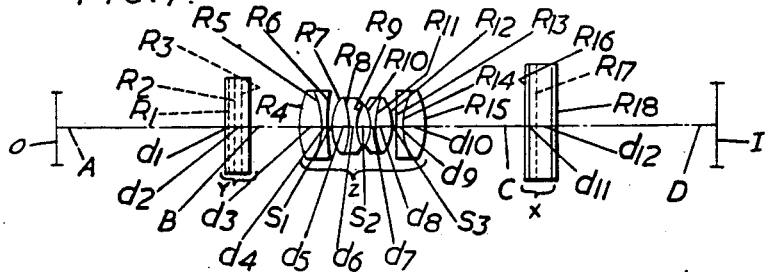
Figure 7A:
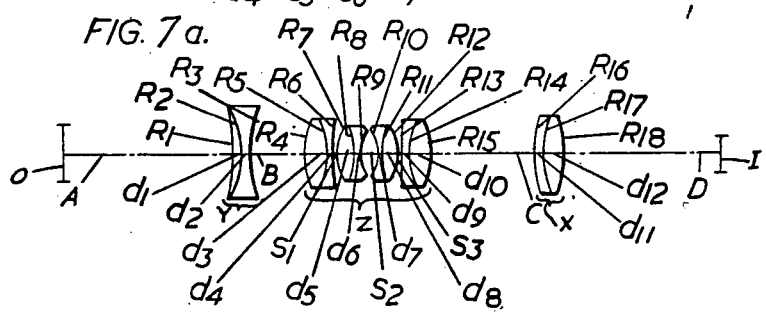

Example VII (Figures 7 and 7a)

| | Plane I (Figure 7) | Plane II (Figure 7a) | $n_d$ | V |
|---|---|---|---|---|
| A = | 4.229 | 4.229 | | |
| $R_1$ = | ∞ | −8.7175 | | |
| $d_1$ = | 0.217 | 0.217 | 1.70035 | 30.3 |
| $R_2$ = | ∞ | −2.3242 | | |
| $d_2$ = | 0.217 | 0.217 | 1.57220 | 57.7 |
| $R_3$ = | ∞ | +3.5543 | | |
| B = | 1.440 | 1.440 | | |
| $R_4$ = | +2.7208 | +2.7208 | | |
| $d_3$ = | 0.611 | 0.611 | 1.69100 | 54.8 |
| $R_5$ = | −1.8196 | −1.8196 | | |
| $d_4$ = | 0.196 | 0.196 | 1.61200 | 44.9 |
| $R_6$ = | +17.1848 | +17.1848 | | |
| $S_1$ = | 0.010 | 0.010 | | |
| $R_7$ = | +1.4034 | +1.4034 | | |
| $d_5$ = | 0.489 | 0.489 | 1.57220 | 57.7 |
| $R_8$ = | −3.4325 | −3.4325 | | |
| $d_6$ = | 0.147 | 0.147 | 1.61200 | 44.9 |
| $R_9$ = | +0.9447 | +0.9447 | | |
| $S_2$ = | 0.489 | 0.489 | | |
| $R_{10}$ = | −0.9395 | −0.9395 | | |
| $d_7$ = | 0.147 | 0.147 | 1.61200 | 44.9 |
| $R_{11}$ = | +3.4325 | +3.4325 | | |
| $d_8$ = | 0.489 | 0.489 | 1.57220 | 57.7 |
| $R_{12}$ = | −1.4034 | −1.4034 | | |
| $S_3$ = | 0.010 | 0.010 | | |
| $R_{13}$ = | −17.1848 | −17.1848 | | |
| $d_9$ = | 0.196 | 0.196 | 1.61200 | 44.9 |
| $R_{14}$ = | +1.8196 | +1.8196 | | |
| $d_{10}$ = | 0.611 | 0.611 | 1.69100 | 54.8 |
| $R_{15}$ = | −2.7208 | −2.7208 | | |
| C = | 2.740 | 2.740 | | |
| $R_{16}$ = | ∞ | +6.7691 | | |
| $d_{11}$ = | 0.220 | 0.220 | 1.70035 | 30.3 |
| $R_{17}$ = | ∞ | +2.7010 | | |
| $d_{12}$ = | 0.484 | 0.484 | 1.52501 | 58.8 |
| $R_{18}$ = | ∞ | −5.1806 | | |
| D = | 4.062 | 4.062 | | |

In these two examples, the spherical member (which may in practice vary considerably in construction) is shown by way of example as of a kind generally similar to that described in United States of America patent specification No. 2,600,207, comprising two divergent meniscus inner components having their air-exposed surfaces concave to a diaphragm between them and two convergent outer components, each of the four components consisting of a doublet having a divergent inner element and a convergent outer element, the mean refractive index of the material of the divergent element in each inner component exceeding that of the associated convergent element by between .03 and .12, whilst the mean refractive index of the material of the convergent element in each outer component exceeds that of the associated divergent element by between .05 and .20. The spherical member is not, however, in this case in itself fully corrected, for the presence of the cylindrical members has to be taken into account in the aberration corrections. Thus, in the plane parallel to the generators of the cylindrical members, the thickness of the material of these members introduces aberrations, which are approximately compensated for by appropriate modification of the dimensions of the spherical member. In the other operative plane, however, the spherical member has to operate at a magnification different from that for which the corrections are calculated in the first operative plane, and this introduces aberrations which are approximately compensated for by those introduced by the cylindrical components. As has been mentioned, this construction for the spherical member has been given by way of example only, and in general it may be said that almost any of the well-known types of highly corrected objective can be modified for use as the spherical member in the present system.

In both Examples VI and VII, each cylindrical member consists of a doublet having a convergent element and a divergent element. The convergent cylindrical member has both its air-exposed surfaces convex and its internal contact is dispersive, whilst the divergent cylindrical member has both its air-exposed surfaces concave and its internal contact is collective.

In both examples, the magnification in the first plane is 1.167 and that in the second plane .5835, so that the compression ratio is 2, the ratio of the greater magnification to the difference between the two magnifications likewise being 2. In Example VI, the equivalent focal length $f_1$ of the convergent front cylindrical member is 7.220, that $f_2$ of the convergent spherical member is 3.993 and that $f_3$ of the divergent rear cylindrical member is 4.983, so that the expression $(f_1+f_3)/2f_2$ amounts to 1.528 and is therefore 0.764 times the ratio of the greater magnification to the difference between the two magnifications. The axial magnification of the convergent cylindrical member is 2.180 and that of the divergent cylindrical member 1.530. In Example VII, the equivalent focal length $f_1$ of the divergent front cylindrical member is 5.331, that $f_2$ of the convergent spherical member is 4.265, and that of the convergent rear cylindrical member is 7.234, so that the expression $(f_1+f_3)/2f_2$ amounts to 1.473, that is to 0.7365 times the ratio of the greater magnification to the difference between the two magnifications. The axial magnification of the convergent cylindrical member is 2.430 and that of the divergent cylindrical member 1.830. The relative aperture is F/2.0 in each example.

It should be noted that either of these examples could, if desired, be turned end for end, in which case the magnification in the first plane would become .857 and that in the second plane 1.714, with a compression ratio of 2. Such inverted arrangement could be used for producing a distorted positive from an undistorted negative, and if the dimensions of the negative are, say, 1.000 horizontally and 0.392 vertically, the distorted positives would have dimensions 0.857 horizontally and 0.672 vertically and could be projected by an anamorphotic projection system on to a screen having an aspect ratio of 2.55 to 1.

Figure 8:
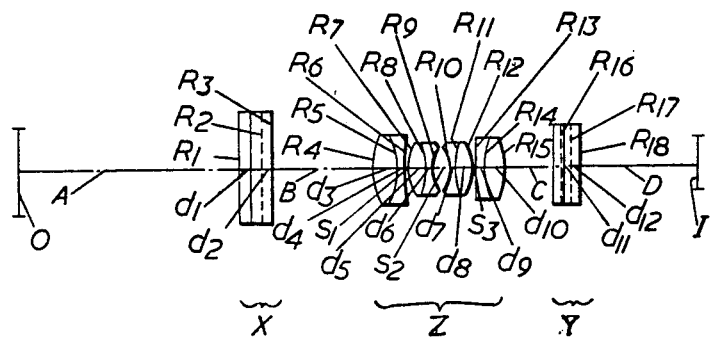
Figure 8A:
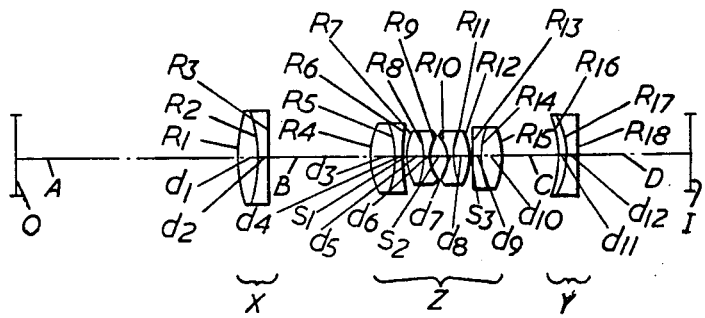

Example VIII, shown in Figures 8 and 8a, illustrates an arrangement for producing a distorted positive from an undistorted negative, having a compression ratio 1.5.

Example VIII (Figures 8 and 8a)

| | Plane I (Figure 8) | Plane II (Figure 8a) | $n_d$ | V |
|---|---|---|---|---|
| A = | 5.692 | 5.692 | | |
| $R_1$ = | ∞ | +4.509 | | |
| $d_1$ = | 0.570 | 0.570 | 1.50970 | 64.4 |
| $R_2$ = | ∞ | −4.169 | | |
| $d_2$ = | 0.237 | 0.237 | 1.74400 | 44.7 |
| $R_3$ = | ∞ | −34.503 | | |
| B = | 2.503 | 2.503 | | |
| $R_4$ = | +2.424 | +2.424 | | |
| $d_3$ = | 0.522 | 0.522 | 1.69100 | 54.8 |
| $R_5$ = | −1.842 | −1.842 | | |
| $d_4$ = | 0.190 | 0.190 | 1.6159 | 44.5 |
| $R_6$ = | +11.298 | +11.298 | | |
| $S_1$ = | 0.0095 | 0.0095 | | |
| $R_7$ = | +1.304 | +1.304 | | |
| $d_5$ = | 0.4179 | 0.4179 | 1.56938 | 55.8 |
| $R_8$ = | −4.019 | −4.091 | | |
| $d_6$ = | 0.1425 | 0.1425 | 1.6159 | 44.5 |
| $R_9$ = | +0.8850 | +0.8850 | | |
| $S_2$ = | 0.4748 | 0.4748 | | |
| $R_{10}$ = | −0.9244 | −0.9244 | | |
| $d_7$ = | 0.1425 | 0.1425 | 1.6137 | 43.9 |
| $R_{11}$ = | +4.091 | +4.091 | | |
| $d_8$ = | 0.4179 | 0.4179 | 1.56938 | 55.8 |
| $R_{12}$ = | −1.304 | −1.304 | | |
| $S_3$ = | 0.0684 | 0.0684 | | |
| $R_{13}$ = | −22.430 | −22.430 | | |
| $d_9$ = | 0.1899 | 0.1899 | 1.6159 | 44.5 |
| $R_{14}$ = | +1.696 | +1.696 | | |
| $d_{10}$ = | 0.5223 | 0.5223 | 1.69100 | 54.8 |
| $R_{15}$ = | −2.565 | −2.565 | | |
| C = | 1.2903 | 1.2903 | | |
| $R_{16}$ = | ∞ | −4.130 | | |
| $d_{11}$ = | 0.285 | 0.285 | 1.70035 | 30.3 |
| $R_{17}$ = | ∞ | −2.360 | | |
| $d_{12}$ = | 0.240 | 0.240 | 1.64200 | 58.1 |
| $R_{18}$ = | ∞ | −22.116 | | |
| D = | 3.122 | 3.122 | | |

In this example, the spherical member is generally similar to that employed in Examples VI and VII, and again each cylindrical member consists of a doublet having a convergent element and a divergent element, the convergent cylindrical member having a dispersive internal contact and the divergent cylindrical member a collective internal contact.

The magnification in the first plane is .6173 and that in the second plane is .9259, so that the compression ratio is 1.5, the ratio of the greater magnification to the difference between the two magnifications being 3. The equivalent focal lengths, $f_1$ of the convergent front cylindrical member, $f_2$ of the convergent spherical member, and $f_3$ of the divergent rear cylindrical member, are respectively 12.550, 4.016 and 8.788, so that the expression $(f_1+f_3)/2f_2$ amounts to 2.657 and is therefore 0.886 times the ratio of the greater magnification to the difference between the two magnifications. The axial magnification of the convergent cylindrical member is 1.797 and that of the divergent cylindrical member is 1.403. The relative aperture is F/2.8.

What I claim as my invention and desire to secure by Letters Patent is:

1. An anamorphotic optical system having different magnifications in two mutually perpendicular planes of operation for the same conjugate planes and substantially free from diagonal aberrations, comprising two members having cylindrical surfaces whose generators are parallel to one another, one of such members being convergent and the other divergent in the operative plane at right angles to such generators, and a convergent member having spherical surfaces interposed between the two cylindrical members, the arithmetic mean between the positive values of the equivalent focal lengths of the two cylindrical members bearing a ratio to the equivalent focal length of the spherical member lying between 0.4 and ∞ and also lying between 0.4 and 1.2 times the ratio of the greater of the two magnifications of the complete system in the two planes to the difference between such magnifications, whilst the axial magnification of the convergent cylindrical member lies between 0.8P and 1.6P and the axial magnification of the divergent cylindrical member lies between 0.6P and 1.2P, where P is the compression and expansion ratio of the complete system.

2. An anamorphotic optical system as claimed in claim 1 in which each cylindrical member is compound and includes at least on convergent element and at least one divergent element, the convergent cylindrical member including at least one dispersive internal contact and having its outermost surface remote from the spherical member convex, whilst the divergent cylindrical member includes at least one collective internal contact and has its innermost surface facing the spherical member concave.

3. An anamorphotic optical system having different magnifications in two mutually perpendicular planes of operation for the same conjugate planes, and comprising two members having cylindrical surfaces whose generators are parallel to one another, one of such members being convergent and the other divergent in the operative plane at right angles to such generators, and a convergent member having spherical surfaces interposed between the two cylindrical members, each cylindrical member being compound and including at least one convergent element and at least one divergent element, the convergent cylindrical member including at least one dispersive internal contact and having its outermost surface remote from the spherical member convex, and the divergent cylindrical member including at least one convergent internal contact and having its innermost surface facing the spherical member concave, whilst the radius of curvature in the operative plane of the outermost surface of the convergent cylindrical member lies between $0.75f_2$ and $1.75f_2$ and that of the innermost surface of the divergent cylindrical member lies between $0.5f_2$ and $1.5f_2$, where $f_2$ is the equivalent focal length of the spherical member.

4. An anamorphotic optical system as claimed in claim 3, in which the arithmetic means between the positive values of the equivalent focal lengths of the two cylindrical members bears a ratio to the equivalent focal length of the spherical member lying between 0.4 and 1.2 times the ratio of the greater of the two magnifications of the complete system in the two planes to the difference between such magnifications, whilst the axial magnification of the convergent cylindrical member lies between 0.8P and 1.6P and the axial magnification of the divergent cylindrical member lies between 0.6P and 1.2P, where P is the compression and expansion ratio of the complete system.

5. An anamorphotic optical system as claimed in claim 3, in which each cylindrical member is in the form of a doublet, and the Petzval curvature of the internal contact surface in the convergent cylindrical member lies between —0.1 and —0.4 times the sum of the Petzval curvatures of the two outer surfaces of such member, whilst the Petzval curvature of the internal contact surface in the divergent cylindrical member lies between 0 and —0.25 times the sum of the Petzval curvatures of the two outer surfaces of such divergent member, the Petzval curvature of a surface being defined by the expression $(n^1-n)/n^1 nr$, where $r$ is the radius of curvature of the surface in the operative plane and $n$ and $n^1$ are the mean refractive indices of the materials on the two sides of such surface.

6. An anamorphotic optical system as claimed in claim 3, in which the sum of the Petzval curvatures of all the surfaces of the spherical member lies between +0.1 and —0.1 times the reciprocal of the equivalent focal length of the spherical member, the Petzval curvature of a surface being defined by the expression $(n^1-n)/n^1 nr$, where $r$ is the radius of curvature of the surface in the operative plane and $n$ and $n^1$ are the mean refractive indices of the materials on the two sides of such surface.

7. An anamorphotic optical system having different magnifications in two mutually perpendicular planes of operation for the same conjugate planes, and comprising two members having cylindrical surfaces whose generators are parallel to one another, one of such members being convergent and the other divergent in the operative plane at right angles to such generators, and a convergent member having spherical surfaces interposed between the two cylindrical members, each cylindrical member comprising a doublet having one convergent element and one divergent element, the internal contact surface in the convergent member being dispersive and having Petzval curvature between —0.1 and —0.4 times the sum of the Petzval curvatures of the two outer surfaces of such member, whilst the internal contact surface in the divergent member is collective and has Petzval curvature between 0 and —0.25 times the sum of the Petzval curvatures of the two outer surfaces of such divergent member, the Petzval curvature of a surface being defined by the expression $(n^1-n)/n^1 nr$, where $r$ is the radius of curvature of the surface in the operative plane and $n$ and $n^1$ are the mean refractive indices of the materials on the two sides of such surface.

8. An anamorphotic optical system as claimed in claim 7, in which the arithmetic means between the positive values of the equivalent focal lengths of the two cylindrical members bears a ratio to the equivalent focal length of the spherical member lying between 0.4 and 1.2 times the ratio of the greater of the two magnifications of the complete system in the two planes to the difference between such magnifications, whilst the axial magnification of the convergent cylindrical member lies between 0.8P and 1.6P and the axial magnification of the divergent cylindrical member lies between 0.6P and 1.2P, where P is the compression and expansion ratio of the complete system.

9. An anamorphotic optical system as claimed in claim 7, in which the sum of the Petzval curvatures of all the surfaces of the spherical member lies between +0.1 and —0.1 times the reciprocal of the equivalent focal length of the spherical member.

(References on following page)

References Cited in the file of this patent

UNITED STATES PATENTS

| | | |
|---|---|---|
| 1,938,808 | Ceccarini | Dec. 12, 1933 |
| 1,962,892 | Chretian | June 12, 1934 |
| 2,036,622 | Emmerich | Apr. 7, 1936 |
| 2,428,399 | Timoney | Oct. 7, 1947 |

FOREIGN PATENTS

| | | |
|---|---|---|
| 8,512 | Great Britain | of 1898 |
| 197,907 | Germany | Apr. 30, 1908 |
| 375,581 | Great Britain | June 30, 1932 |
| 416,074 | Great Britain | Sept. 10, 1934 |
| 624,178 | Germany | Jan. 14, 1936 |